US010863534B2

United States Patent
Yu

(10) Patent No.: US 10,863,534 B2
(45) Date of Patent: Dec. 8, 2020

(54) CONTROL CHANNEL TRANSMISSION METHOD AND APPARATUS, AND COMMUNICATIONS NODE

(71) Applicant: Huawei Technologies Co., Ltd., Shenzhen (CN)

(72) Inventor: Zheng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/812,982

(22) Filed: Nov. 14, 2017

(65) Prior Publication Data

US 2018/0070377 A1     Mar. 8, 2018

Related U.S. Application Data

(63) Continuation of application No. PCT/CN2016/082036, filed on May 13, 2016.

(30) Foreign Application Priority Data

May 15, 2015     (CN) .......................... 2015 1 0250208

(51) Int. Cl.
*H04W 72/12*   (2009.01)
*H04L 5/00*    (2006.01)
*H04W 72/04*   (2009.01)

(52) U.S. Cl.
CPC ....... *H04W 72/1278* (2013.01); *H04L 5/0053* (2013.01); *H04W 72/042* (2013.01);
(Continued)

(58) Field of Classification Search
CPC ........... H04W 72/1278; H04W 72/042; H04W 72/0453; H04W 72/1205; H04L 5/0053; H04L 5/003
(Continued)

(56) References Cited

U.S. PATENT DOCUMENTS

| 2012/0009963 A1 | 1/2012 | Kim et al. |
| 2013/0083753 A1* | 4/2013 | Lee ................... H04W 74/0833 370/329 |

(Continued)

FOREIGN PATENT DOCUMENTS

| CN | 102104933 A | 6/2011 |
| CN | 103002579 A | 3/2013 |

(Continued)

OTHER PUBLICATIONS

LG Electronics; "Downlink control channel related issues for MTC"; 3GPP TSG RAN WG1 Meeting #80bis; R1-151487; Belgrade, Serbia; Apr. 20-24, 2015; 10 pages.

*Primary Examiner* — Hassan A Phillips
*Assistant Examiner* — Mohammed S Chowdhury
(74) *Attorney, Agent, or Firm* — Conley Rose, P.C.

(57) ABSTRACT

The present disclosure discloses a control channel transmission method, which includes: sending a first message to user equipment UE, where the first message includes a set of control channel configuration information; determining, for the user equipment (UE) according to the set of control channel configuration information, control channel configuration information used to transmit a control channel; and transmitting the control channel according to the control channel configuration information that is determined for the UE and used to transmit the control channel. The control channel configuration information used to transmit the control channel may be determined for the user equipment, and the control channel is transmitted (that is, received or sent) according to the control channel configuration information. Therefore, when transmitting the control channel, the UE can directly transmit a control channel corresponding to the control channel configuration information. In this way, detection complexity of the UE is reduced.

20 Claims, 9 Drawing Sheets

(52) U.S. Cl.
CPC ......... *H04W 72/0453* (2013.01); *H04L 5/003* (2013.01); *H04W 72/1205* (2013.01)

(58) Field of Classification Search
USPC ......................................................... 370/329
See application file for complete search history.

(56) References Cited

U.S. PATENT DOCUMENTS

| | | | |
|---|---|---|---|
| 2014/0098761 A1* | 4/2014 | Lee | H04W 72/005 |
| | | | 370/329 |
| 2016/0360551 A1* | 12/2016 | Bergman | H04W 74/006 |
| 2017/0201306 A1* | 7/2017 | Shimezawa | H04W 52/0216 |
| 2017/0201308 A1* | 7/2017 | Park | H04B 17/24 |
| 2017/0290008 A1* | 10/2017 | Tooher | H04L 1/0007 |
| 2017/0295601 A1* | 10/2017 | Kim | H04W 72/04 |
| 2018/0007709 A1* | 1/2018 | Seo | H04L 1/00 |
| 2018/0132257 A1* | 5/2018 | Golitschek Edler von Elbwart | H04W 72/0446 |

FOREIGN PATENT DOCUMENTS

| | | |
|---|---|---|
| CN | 103037511 A | 4/2013 |
| CN | 103427970 A | 12/2013 |
| CN | 103457710 A | 12/2013 |
| CN | 103458509 A | 12/2013 |
| CN | 103973412 A | 8/2014 |
| CN | 104253678 A | 12/2014 |
| CN | 105099639 A | 11/2015 |
| WO | 2013067266 A1 | 5/2013 |

\* cited by examiner

CONTROL CHANNEL TRANSMISSION METHOD AND APPARATUS, AND COMMUNICATIONS NODE

CROSS-REFERENCE TO RELATED APPLICATIONS

This application is a continuation of PCT Application No. PCT/CN2016/082036, filed on May 13, 2016, which claims priority to Chinese Patent Application No. 201510250208.3, filed on May 15, 2015, The disclosures of the aforementioned applications are hereby incorporated by reference in their entireties.

TECHNICAL FIELD

The present application relates to the field of communications technologies, and in particular, to a control channel transmission method and apparatus, and a communications node.

BACKGROUND

In an existing communications system, a control channel is a channel for transmitting control information to user equipment. For example, the control channel may be a control channel for scheduling dedicated data for the UE, and/or a control channel for scheduling common data (for example, the common data is system information, a random access response message, or a paging message) for the UE. For example, the control channel is an EPDCCH or a control channel (for example, an M-PDCCH) used for machine type communication MTC UE.

To receive control information transmitted on a control channel, the UE needs to pre-obtain configuration information of the control channel. In the prior art, when obtaining configuration information of the UE from configuration information delivered by a base station, the UE needs to perform blind control channel detection on all received configuration information one piece by one piece until the blind detection succeeds. This manner of determining a control channel by means of blind detection greatly increases detection complexity of the UE.

SUMMARY

To resolve the foregoing technical problem, embodiments of the present disclosure provide a control channel transmission method and apparatus, and a communications node, so as to reduce blind detection complexity occurring when UE receives a control channel. Technical solutions are as follows:

A control channel transmission method is provided, and the method includes:

sending a first message to user equipment UE, where the first message includes a set of control channel configuration information, the set of control channel configuration information includes one or more pieces of configuration information, and each piece of configuration information in the set of control channel configuration information is used to indicate a first parameter configuration used to transmit one or more control channels;

determining, for the user equipment UE according to the set of control channel configuration information, control channel configuration information used to transmit a control channel; and transmitting the control channel according to the control channel configuration information that is determined for the UE and used to transmit the control channel.

A control channel transmission method is provided, and the method includes:

receiving a first message, where the first message includes a set of control channel configuration information, the set of control channel configuration information includes one or more pieces of configuration information, and each piece of configuration information in the set of control channel configuration information is used to indicate a first parameter configuration used to transmit one or more control channels;

determining, according to the set of control channel configuration information, control channel configuration information used to transmit a control channel; and transmitting the control channel according to the determined control channel configuration information used to transmit the control channel.

A control channel transmission apparatus is provided, and the apparatus includes:

a sending unit, configured to send a first message to user equipment UE, where the first message includes a set of control channel configuration information, the set of control channel configuration information includes one or more pieces of configuration information, and each piece of configuration information in the set of control channel configuration information is used to indicate a first parameter configuration used to transmit one or more control channels;

a determining unit, configured to determine, for the user equipment UE according to the set of control channel configuration information, control channel configuration information used to transmit a control channel; and a transmission unit, configured to transmit the control channel according to the control channel configuration information that is determined for the UE and used to transmit the control channel.

A control channel transmission apparatus is provided, and the apparatus includes:

a receiving unit, configured to receive a first message, where the first message includes a set of control channel configuration information, the set of control channel configuration information includes one or more pieces of configuration information, and each piece of configuration information in the set of control channel configuration information is used to indicate a first parameter configuration used to transmit one or more control channels;

a determining unit, configured to determine, according to the set of control channel configuration information, control channel configuration information used to transmit a control channel; and a transmission unit, configured to transmit the control channel according to the determined control channel configuration information used to transmit the control channel.

According to the method and apparatus that are provided in the embodiments of the present disclosure, for a network side device, a first message delivered by the network side device to user equipment includes a set of control channel configuration information, and the set of control channel configuration information includes one or more pieces of configuration information. Control channel configuration information used to transmit a control channel is determined for the user equipment from the set of control channel configuration information, and the control channel is transmitted according to one or more pieces of configuration information that are determined for the UE and used to transmit the control channel. For a user equipment side, the user equipment side receives the first message, and determines, from the set of control channel configuration information included in the first message, the control channel configuration information used to transmit the control channel, so as to transmit the control channel.

The control channel configuration information used to transmit the control channel may be determined for the user equipment, and the control channel is transmitted (that is, received or sent) according to the control channel configuration information. Therefore, when transmitting the control channel, the UE can directly transmit a control channel corresponding to the control channel configuration information. In this way, detection complexity of the UE is reduced.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
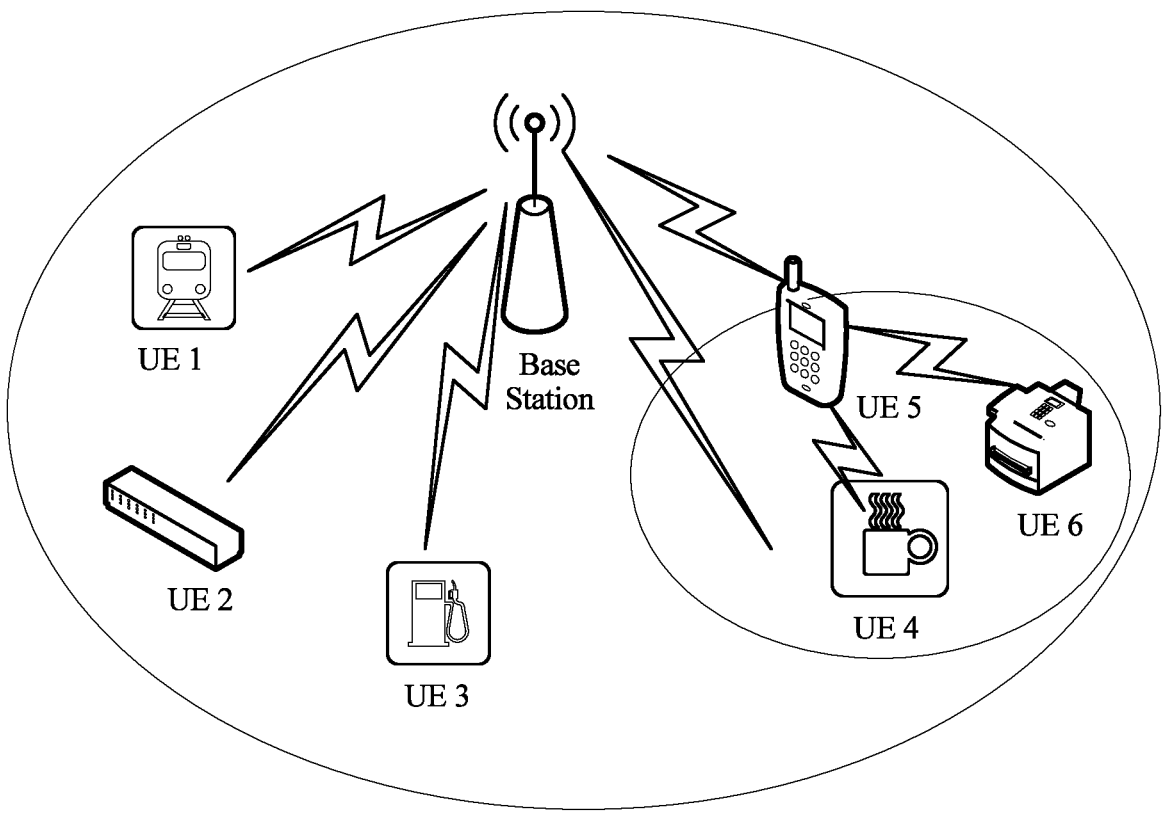
FIG. 1 is a diagram of a system architecture or a scenario to which embodiments of this application are applied.

FIG. 1 is a diagram of a system architecture or a scenario to which embodiments of this application are applied. As shown in FIG. 1, a base station and UE 1 to UE 6 form a communications system. In this communications system, the base station sends one or more of system information, a random access response (RAR) message, or a paging message to one or more UEs of the UE 1 to the UE 6. In addition, UE 4 to the UE 6 may form a communications system. In this communications system, UE 5 may send the one or more of the system information, the RAR message, or the paging message to the UE 4, the UE 6, or the UE 4 and the UE 6.

In actual application, the present disclosure is mainly applied to a Long Term Evolution (LTE) system or a Long Term Evolution Advanced (LTE-A) system. Certainly, the present disclosure may be applied to another communications system as long as there is an entity, in this communications system, that can send the one or more of the system information, the RAR message, or the paging message, and there is another entity, in this communications system, that can receive the one or more of the system information, the RAR message, or the paging message.

It should be noted that transmission in the present disclosure may be sending or receiving. If one of two devices that communicate with each other understands the transmission as sending, the other one of the two devices that communicate with each other understands the transmission as receiving; vice versa.

Figure 2:
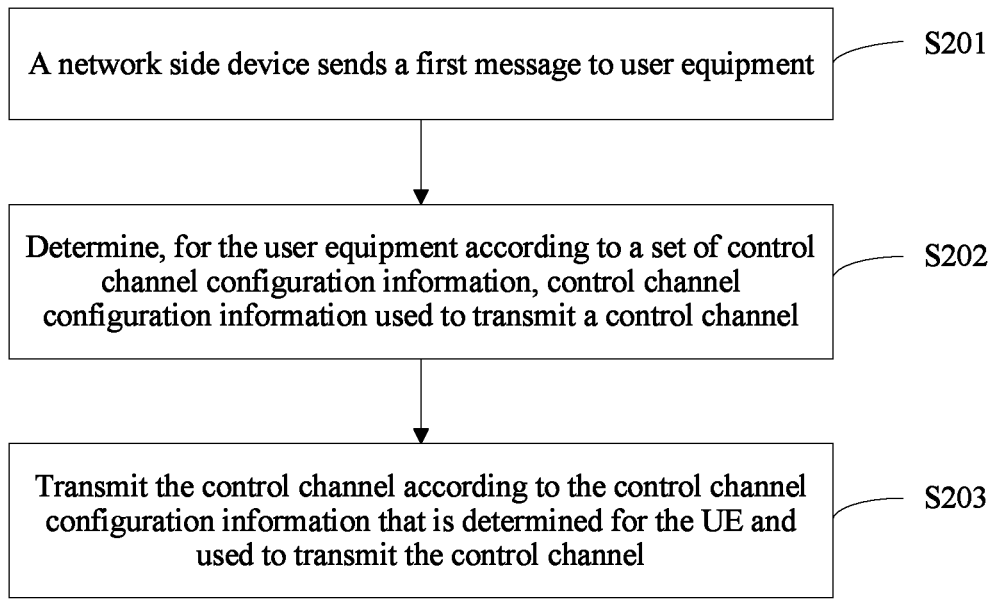
FIG. 2 is a schematic flowchart of a control channel transmission method according to an embodiment of this application.

An embodiment:

FIG. 2 is a schematic flowchart of a control channel transmission method according to an embodiment of this application.

As shown in FIG. 2, the control channel transmission method provided in this embodiment of this application includes the following steps.

S201. A network side device sends a first message to user equipment, where the first message includes a set of control channel configuration information, and the set of control channel configuration information includes one or more pieces of configuration information.

This embodiment is described from a perspective of a network side device, and the network side device is a communications entity that can send one or more of system information, an RAR message, or a paging message. For example, the network side device may be a base station or user equipment.

Each piece of configuration information in the set of control channel configuration information is used to indicate a first parameter configuration used to transmit one or more control channels. A first parameter may include one or more parameters.

It should be noted that, in order that the user equipment can receive the sent first message, a transmission bandwidth of the first message needs to fall within a bandwidth range in which the user equipment can receive data.

The control channel in this embodiment is not limited to one or more of the following control channels:

a UE-dedicated control channel, a cell-dedicated control channel, a control channel for scheduling a contention resolution message, a first UE-specific control channel, a control channel for scheduling a random access response message, or an uplink control channel.

The first message in this embodiment is a common message, and the common message is a message sent for all UEs or some UEs in a cell. For example, the first message may be system information.

In this embodiment, to transmit a control channel, configuration information of the first parameter configuration used to transmit the control channel needs to be first delivered. In this embodiment, one piece of configuration information may be corresponding to transmission of one or more control channels. Different configuration information is corresponding to different control channels. That is, the different configuration information is used to configure, for the different control channels, related parameters used for transmission.

The configuration information in the present disclosure includes common configuration information of the control channel and/or dedicated configuration information of the control channel. Information included in the common configuration information of the control channel is different from information included in the dedicated configuration information of the control channel. For example, UE-dedicated related configuration information in the control channel configuration information is the dedicated configuration information of the control channel. For example, cell-specific related configuration information in the control channel configuration information is the common configuration information of the control channel.

In this application, the first message may include the common configuration information of the control channel and the dedicated configuration information of the control channel. Certainly, the first message may include only the common configuration information of the control channel, and the dedicated configuration information of the control channel is carried in a second message. Correspondingly, the dedicated configuration information is used to indicate a second parameter configuration used to transmit one or more control channels. A second parameter includes one or more parameters. The parameter included in the second parameter is different from the parameter included in the first parameter. For example, the control channel configuration information is determined by the common configuration information in the first message and the dedicated configuration information carried in the second message.

In this application, a parameter may be equal to information. The dedicated configuration information of the control channel or the common configuration information of the control channel may include one or more pieces of information (or parameters) of the following information (or parameters). That is, each of the following information may be equal to a parameter:

subframe pattern information;
start symbol information;
information about a quantity of control channel sets;
control channel set identifier information;
transmission type information;
resource block allocation information;
information about a quantity of paired physical resource blocks;
initialization information of a scrambling code sequence of a demodulation reference signal;
physical uplink control channel-resource start offset information;
configuration identification information of mapping between a resource element and a quasi-collocation site;
information about a quantity of times of repetitions or a repetition level of a control channel;
information about a control channel modulation manner;
control channel coding information;
control channel power setting information;
configuration information of a frequency resource for control channel transmission;
configuration information of a time resource for control channel transmission;
configuration information of a start time resource for control channel transmission;
frequency hopping information for control channel transmission;
configuration information of a pilot or a reference signal used for control channel demodulation;
information about an aggregation level or an aggregation level set used for control channel transmission;
information about a candidate control channel index used for control channel transmission;
configuration information of search space for control channel transmission;
information about an antenna port used for control channel transmission;
a scrambling code or scrambling code initialization information used for control channel transmission;
related information that determines a physical uplink control channel resource;
uplink resource configuration information; and
uplink pilot reference signal information.

The following further describes each piece of information:

The subframe pattern information indicates a subframe in which a control channel is transmitted.

The start symbol information indicates a start symbol indicating that control channel transmission starts.

The information about a quantity of control channel sets indicates a quantity of control channel sets.

The control channel set identifier information indicates an index or a number of a control channel set.

The transmission type information indicates whether control channel transmission is distributed or centralized.

The resource block allocation information indicates a resource location of a physical resource block that forms a control channel set.

The information about a quantity of paired physical resource blocks indicates a quantity of paired physical resource blocks.

The initialization information of a scrambling code sequence of a demodulation reference signal configures an initialization parameter of a scrambling code sequence of a demodulation reference signal.

The physical uplink control channel-resource start offset information indicates a start resource of a physical uplink control channel.

The configuration identification information of mapping between a resource element and a quasi-collocation site indicates related information of mapping between a quasi-collocation site and a resource element.

The information about a quantity of times of repetitions or a repetition level of a control channel indicates a quantity of times of repetitions or a level used for control channel transmission.

The information about a control channel modulation manner indicates a modulation manner used for control channel transmission.

The control channel coding information indicates information such as a coding manner and/or a code rate used for control channel transmission.

The control channel power setting information indicates power configuration information used for control channel transmission, for example, a power improvement amplitude and/or whether power improvement is used.

The configuration information of a frequency resource for control channel transmission indicates a frequency resource used for control channel transmission. For example, the configuration information of a frequency resource for control channel transmission indicates one or more of a start frequency resource location, a subband resource location, or a size of the used frequency resource.

The configuration information of a time resource for control channel transmission indicates a time resource used for control channel transmission. For example, the configuration information of a time resource for control channel transmission indicates one or more of a start time resource location, a transmission period, or a start radio frame.

The frequency hopping information for control channel transmission configures a parameter related to control channel frequency hopping and/or indicates a frequency hopping pattern for control channel transmission.

The configuration information of a pilot or a reference signal used for control channel demodulation sets a parameter related to a pilot or a reference signal used for control channel demodulation. For example, the configuration information of a pilot or a reference signal used for control channel demodulation sets one or more of a type of a reference signal, a quantity of antennas of a reference signal, or a port of a reference signal that is used by a control channel.

The information about an aggregation level or an aggregation level set used for control channel transmission indicates an aggregation level or an aggregation level set used for control channel transmission.

The information about a candidate control channel index used for control channel transmission indicates a candidate control channel index that can be used or is used for control channel transmission.

The configuration information of search space for control channel transmission sets a related parameter of search space that determines a control channel.

The information about an antenna port used for control channel transmission indicates an antenna port used for control channel transmission.

The scrambling code or the scrambling code initialization information used for control channel transmission indicates a parameter configuration of a scrambling code that generates control channel transmission.

The related information that determines a physical uplink control channel resource configures a parameter that determines a physical uplink control channel resource, for example, one or more pieces of response feedback resource offset information, information about an uplink subband on which a physical uplink control channel is located, or duplex spacing information.

The uplink resource configuration information indicates information about an uplink subband on which uplink data scheduled by a control channel is located.

The uplink pilot reference signal information indicates a parameter configuration of a reference signal of uplink data scheduled by a control channel.

S202. Determine, for the user equipment UE according to the set of control channel configuration information, control channel configuration information used to transmit a control channel.

In this embodiment, to improve flexibility of blind detection by the user equipment, one or more pieces of configuration information for control channel transmission may be determined for the user equipment.

In actual application, in a first method for determining, for the user equipment, the one or more pieces of configuration information used to transmit the control channel, the one or more pieces of configuration information used to transmit the control channel are determined for the UE according to one or more of a first identifier of the UE, a first system parameter, or a first predetermined rule. For example, a specific determining rule of determining, for the UE according to the one or more of the first identifier of the UE, the first system parameter, or the first predetermined rule, the one or more pieces of configuration information used to transmit the control channel is predefined by a system for the network side device and/or the UE.

For example, in this application, a UE-related identifier (for example, a UE identifier, a UE-specific identifier, or an $X^{th}$ identifier of the UE, where X is a sequence number) may be one or more of a preamble index, a temporary cell radio network temporary identifier, a cell radio network temporary identifier, an international mobile temporary mobile station identifier (e.g., SAE Temporary Mobile Station Identifier (S-TMSI)), an international mobile subscriber identity (IMSI), an international mobile equipment identity (IMEI), or a randomly generated number.

For example, the first system parameter may be a system time parameter and/or a system configuration parameter. Specifically, the system time parameter may be one or more of a radio frame number, a subframe number, a hyper frame number, or a cycle. For example, the system configuration parameter is a parameter configured in a system message or a parameter implicitly indicated in a system message.

In a second method for determining, for the user equipment, the one or more pieces of configuration information used to transmit the control channel, a second message is sent, and the second message is a message sent for one or more UEs in a cell. Specifically, the second message carries indication information, and the indication information is used to indicate one or more pieces of configuration information used to transmit the control channel for the UE. For example, the indication information includes one or more pieces of the following information: configuration information index information, frequency resource index information, or time resource index information. Alternatively, the second message is used to carry UE-dedicated related configuration information in the control channel configuration information, and the control channel configuration information used to transmit the control channel is determined according to the configuration information in the first message and the UE-dedicated related configuration information.

The second message and the first message are different messages. For example, the second message may be a random access response message or a UE-dedicated message. The UE-dedicated message is a message sent only to specific UE.

The control channel configuration information is configured or indicated in the first message (for example, system information), and the second message (for example, an RAR) includes information for reducing or eliminating blind detection performed by the UE on the control channel. For example, the RAR includes one or more of sequence number information, sequence information, time information, frequency information, an aggregation level, a frequency hopping pattern, a candidate control channel index, a quantity of times of repetitions, an enhancement level, or a downlink control information format that is used by the UE to detect the control channel.

The common configuration information of the control channel is configured or indicated in the first message (for example, the system information), and the RAR carries the dedicated configuration information of the control channel. The common configuration information of the control channel is information that is the same for a group of UEs or information that is the same for UEs in a cell. The dedicated configuration information of the control channel is UE-specific configuration information. For example, the RAR carries physical uplink control channel-resource start offset (pucch-ResourceStartOffset) information.

In the control channel configuration information, some configuration information may be predefined, the common configuration information of the control channel is configured or indicated in the first message (for example, the system information), and the second message (for example, the RAR) carries the dedicated configuration information of the control channel.

S203. Transmit the control channel according to the control channel configuration information that is determined for the UE and used to transmit the control channel.

In this embodiment, one or more pieces of configuration information used to transmit a control channel may be determined for user equipment, and the control channel is transmitted according to the one or more pieces of configuration information. Therefore, when receiving the control channel, the UE can directly receive a control channel transmitted according to the one or more pieces of configuration information. In this way, the UE is prevented from detecting a control channel transmitted according to all configuration information, and complexity of control channel detection by the UE is accordingly reduced.

Another embodiment:

In this embodiment, configuration information in a set of control channel configuration information is associated with a subband. The subband refers to a frequency resource on which a specific frequency width on a carrier is occupied. For example, a subband may include one or more physical resource blocks (PRB), or may include one or more subcarriers. Alternatively, a frequency resource width and a frequency resource location of each subband are predetermined or preconfigured.

Figure 3:
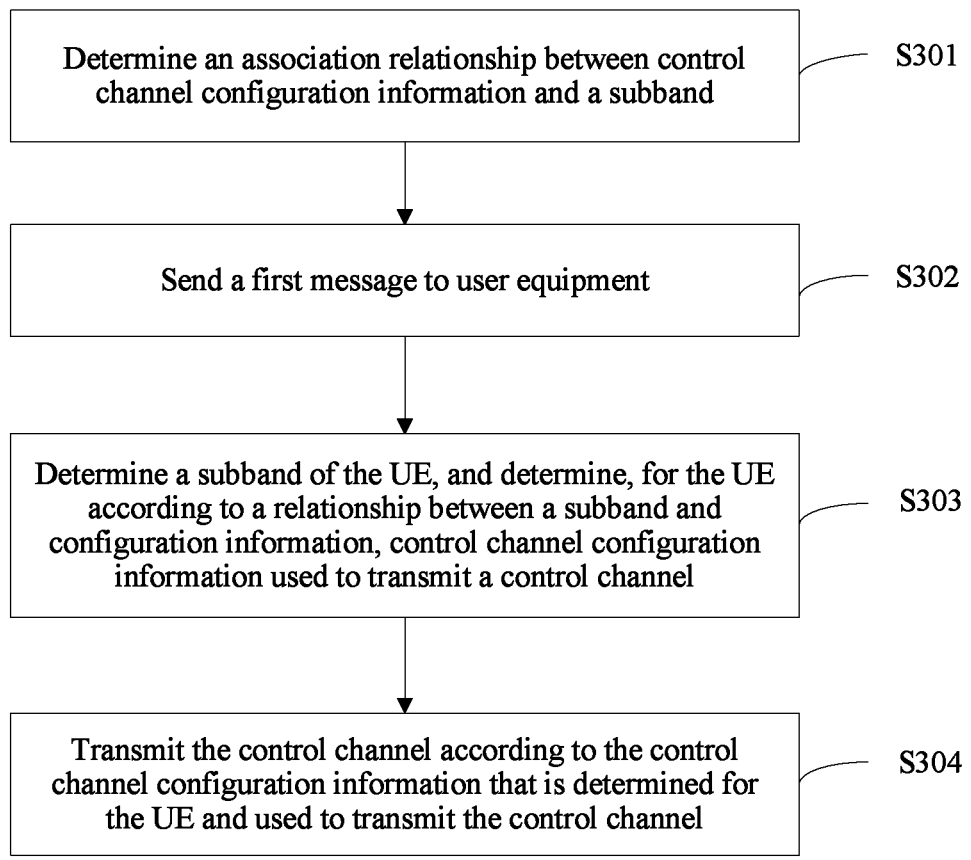
FIG. 3 is a schematic flowchart of a control channel transmission method according to another embodiment of this application.

FIG. 3 is a schematic flowchart of a control channel transmission method according to another embodiment of this application.

As shown in FIG. 3, the control channel transmission method includes the following steps.

S301. Determine an association relationship between control channel configuration information and a subband. A subband is used to transmit the first message, and each subband is associated with one or more pieces of configuration information. The association relationship between control channel configuration information and a subband may be predefined, or may be determined by a base station and notified by the base station to user equipment.

S302. Send a first message to user equipment, where the first message includes a set of control channel configuration information, and the set of control channel configuration information includes one or more pieces of configuration information.

Each piece of configuration information in the set of control channel configuration information is used to indicate a first parameter configuration used to transmit one or more control channels. Optionally, the first message may include the association relationship between control channel configuration information and a subband.

S303. Determine a subband of the UE, and determine, for the UE according to an association relationship between a subband and configuration information, control channel configuration information used to transmit a control channel.

In actual application, the subband on which the UE transmits the control channel may be determined according to one or more of a third identifier of the UE, a third system parameter, or a third predetermined rule. Alternatively, the base station may explicitly or implicitly indicate subband information to the UE by using signaling or a channel. For example, the base station indicates the subband information to the UE by using an RAR message.

A specific determining rule of determining the subband for the UE according to the one or more of the third identifier of the UE, the third system parameter, or the third predetermined rule may be predefined by a system for a network side device and/or the UE.

For example, the third identifier of the UE may be one or more of a preamble index, a temporary cell radio network temporary identifier, a cell radio network temporary identifier, an international mobile temporary mobile station identifier (e.g., S-TMSI), an international mobile subscriber identity (IMSI), an international mobile equipment identity (IMEI), or a randomly generated number.

For example, the third system parameter may be a system time parameter and/or a system configuration parameter. Specifically, the system time parameter may be one or more of a radio frame number, a subframe number, a hyper frame number, or a cycle. For example, the system configuration parameter is a parameter configured in a system message or a parameter implicitly indicated in a system message.

S304. Transmit the control channel according to the control channel configuration information that is determined for the UE and used to transmit the control channel.

To increase a quantity of control channels transmitted according to one piece of configuration information, the base station may send one or more control channels according to the one piece of configuration information. When the base station needs to send multiple control channels according to one piece of configuration information, the multiple control channels may be transmitted on different time and/or frequency resources. In this case, when the UE detects the control channel, although the UE assumes or determines control channel configuration information used to detect the control channel, the UE still cannot determine a specific time and/or frequency resource on which a control channel sent by the base station to the UE is transmitted.

Therefore, in a method, the UE blindly detects all possible control channels corresponding to one piece of control channel configuration information. That is, the UE blindly detects the control channels on all possible time or frequency resources on which the control channels are transmitted and that are corresponding to the one piece of control channel configuration information. Apparently, complexity of control channel detection by the UE is increased in this case. In particular, when a control channel is repeatedly transmitted, if the control channel is blindly detected in the foregoing manner, detection complexity and power consumption overheads of the UE are greatly increased.

To reduce blind detection complexity occurring when the UE detects all possible control channels corresponding to one piece of control channel configuration information, the UE may be instructed to monitor the control channels on a specific time and/or frequency resource. In this way, the UE is prevented from attempting to monitor the control channels on all possible time and/or frequency resources, and detection complexity of the UE is accordingly reduced and power consumption overheads of the UE are accordingly reduced.

Specifically, a time resource and/or a frequency resource on which the UE is to receive or send a control channel may be determined according to one or more of a second identifier of the UE, a second system parameter, or a second predetermined rule; and/or the network side device sends a third message to the UE, where the third message is a message sent for one or more UEs in a cell, the third message carries indication information, the indication information is used to indicate a time resource and/or a frequency resource on which the UE is to receive or send a control channel, and the third message and the first message are different messages. For example, the third message is a random access response message or a UE-dedicated message. For example, the indication information includes one or more pieces of the following information: configuration information index information, frequency resource index information, or time resource index information. Specifically, the base station adds, into the random access response message, information about a time or frequency resource on which the UE is to monitor the control channel.

If control channel transmission is of multiple enhancement levels, an enhancement level (or a transmission level) of the UE needs to be first determined. For example, the enhancement level (or the transmission level) may be one or more of a repetition level, a transmission time interval (TTI) bundling level, a coverage enhancement level, a power improvement level, a retransmission level, a continuous attempt level, a channel quality level, or a resource level.

One enhancement level may be corresponding to control channel configuration information of one or more subbands. Control channel configuration information of each subband includes one or more pieces of control channel configuration information.

When one enhancement level is corresponding to control channel configuration information of multiple subbands, the enhancement level of the UE needs to be first determined. Then, control channel configuration information that is of multiple subbands and that is corresponding to the determined enhancement level is obtained. Next, according to the foregoing method, the subband of the UE is determined, and then specific control channel configuration information that should be used to detect the control channel is determined from multiple pieces of control channel configuration information corresponding to the determined subband.

In this embodiment, a subband is associated with control channel configuration information, one or more pieces of configuration information used to transmit a control channel are determined for user equipment by using a subband, and the control channel is transmitted according to the one or more pieces of configuration information. Therefore, when receiving or sending the control channel, the UE can directly transmit a control channel corresponding to the one or more pieces of configuration information. In this way, complexity of control channel detection or control channel sending by the UE is reduced.

In another embodiment, configuration information in a set of control channel configuration information is associated with a group. For example, a group may be a user equipment group or a preamble group. Each piece of control channel configuration information is associated with a group. Multiple pieces of control channel configuration information may be associated with one group, or each group may be associated with only one piece of control channel configuration information. A base station may configure control channel configuration information corresponding to one or more groups.

Figure 4:
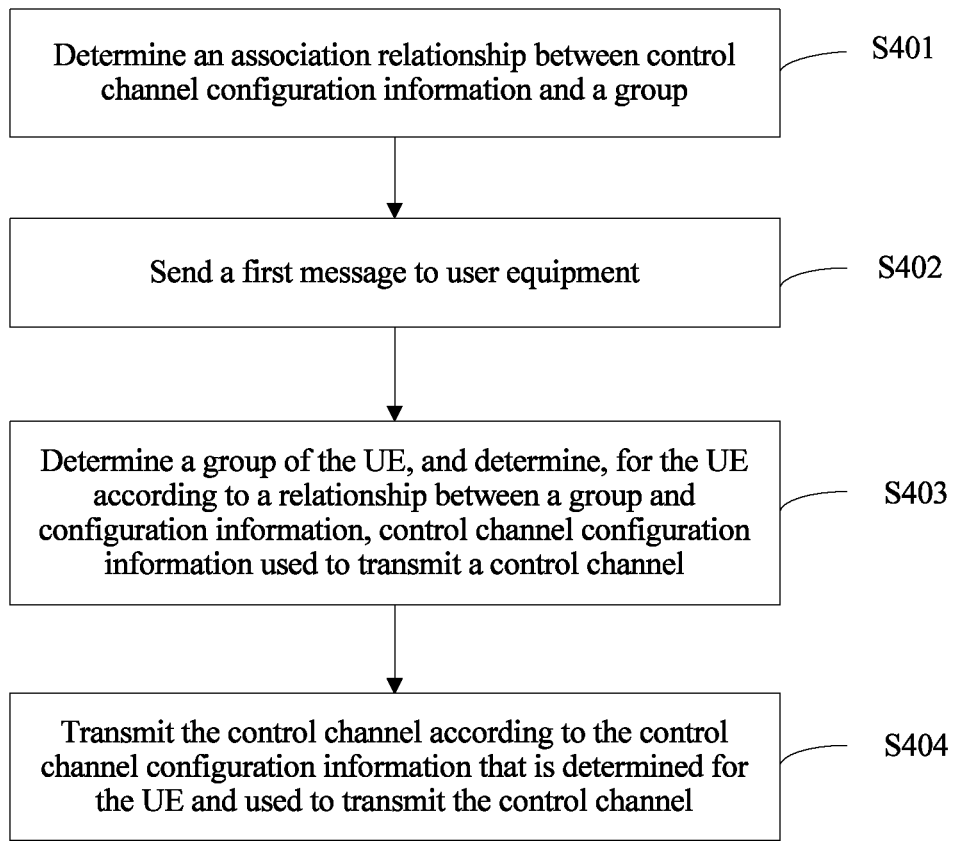
FIG. 4 is a schematic flowchart of a control channel transmission method according to another embodiment of this application.

FIG. 4 is a schematic flowchart of a control channel transmission method according to another embodiment of this application.

As shown in FIG. 4, the control channel transmission method includes the following steps.

S401. Determine an association relationship between control channel configuration information and a group, where each group is associated with one or more pieces of configuration information, and the association relationship between control channel configuration information and a group may be predefined, or may be determined by a base station and notified by the base station to user equipment.

S402. Send a first message to the user equipment, where the first message includes a set of control channel configuration information, and the set of control channel configuration information includes one or more pieces of configuration information.

Each piece of configuration information in the set of control channel configuration information is used to indicate a first parameter configuration used to transmit one or more control channels. Optionally, the first message may include the association relationship between control channel configuration information and a group.

S403. Determine a group in which the UE is located, and determine, for the user equipment UE according to an association relationship between a group and configuration information, control channel configuration information used to transmit a control channel.

Similar to a method for determining a subband of the UE in the foregoing embodiment, the group of the UE may be determined by using one or more of a fourth identifier of the UE, a fourth system parameter, or a fourth predetermined rule. Alternatively, group information may be indicated to the UE by using signaling. For example, the group information (for example, the group information may be a group index) of the UE is indicated to the UE by using an RAR.

When multiple pieces of control channel configuration information are associated with one group, specific control channel configuration information that is corresponding to the group of the UE and that should be used by the UE to detect the control channel may be determined according to the one or more of the fourth identifier of the UE, the fourth system parameter, or the fourth predetermined rule. Alternatively, the base station may notify, by using signaling, the UE of control channel configuration information that should be used by the UE. For example, the base station notifies, by using an RAR, the UE of the control channel configuration information that should be used by the UE. When obtaining the RAR, the UE learns of the specific control channel configuration information that should be used to detect the control channel.

Similar to description in the foregoing embodiment, the base station may send one or more control channels according to one piece of control channel configuration information. When the base station needs to send multiple control channels according to one piece of control channel configuration information, the multiple control channels may be transmitted on different time and/or frequency resources. A time or frequency resource on which the UE is to monitor the control channel may be determined according to one or more of a UE identifier, a system parameter, or a predetermined rule; and/or the base station adds, into the RAR, indication information of the time or frequency resource on which the UE is to monitor the control channel.

S404. Transmit the control channel according to the control channel configuration information that is determined for the UE and used to transmit the control channel.

In this embodiment, a group is associated with control channel configuration information, one or more pieces of configuration information used to transmit a control channel are determined for user equipment by using a group, and the control channel is transmitted according to the one or more pieces of configuration information. Therefore, when receiving or sending the control channel, the UE can directly transmit a control channel corresponding to the one or more pieces of configuration information. In this way, complexity of control channel detection or control channel sending by the UE is reduced.

The following describes a control channel transmission method provided in the embodiments of this application from a user equipment side. The control channel transmission method described below and the control channel transmission method described above can be mutually referenced.

Figure 5:
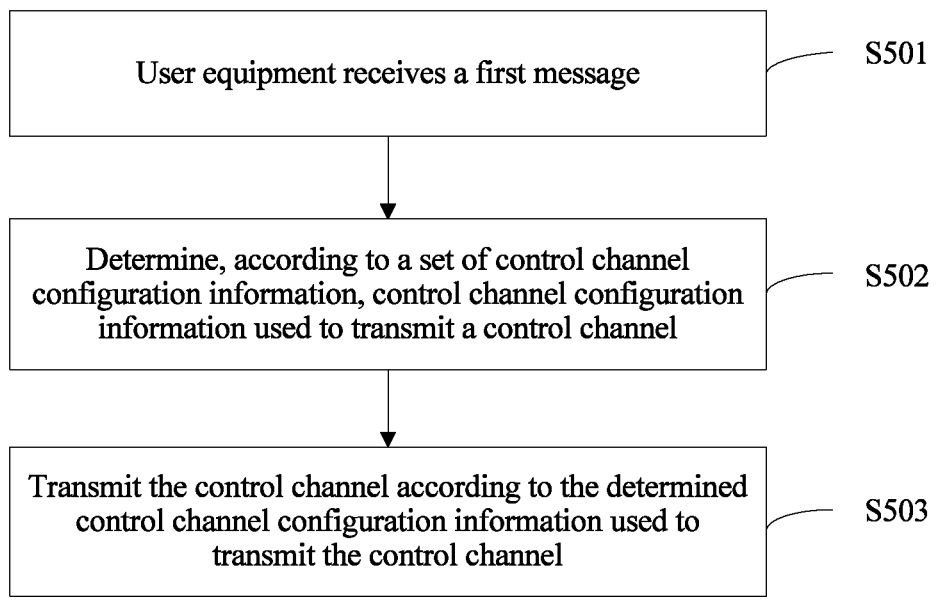
FIG. 5 is a schematic flowchart of a control channel transmission method according to another embodiment of this application.

FIG. 5 is a schematic flowchart of a control channel transmission method according to another embodiment of this application.

As shown in FIG. 5, the control channel transmission method provided in this embodiment of this application includes the following steps.

S501. User equipment receives a first message, where the first message includes a set of control channel configuration information, and the set of control channel configuration information includes one or more pieces of configuration information.

Each piece of configuration information in the set of control channel configuration information is used to indicate a first parameter configuration used to transmit one or more control channels.

In this embodiment, a resource used to transmit the first message falls within a bandwidth range in which the user equipment can receive data.

It should be noted that the user equipment in this embodiment may be common user equipment, may be low-complexity or low-cost user equipment, or may be new-class or new-type user equipment.

The low-complexity or low-cost user equipment is user equipment whose operating bandwidth is less than a maximum carrier bandwidth specified in a system, or a specific carrier bandwidth. An operating bandwidth may be one or more of a radio frequency processing bandwidth, a baseband processing bandwidth, a filter processing bandwidth, or a signal processing bandwidth. For example, six system bandwidths: 1.4 MHz, 3 MHz, 5 MHz, 10 MHz, 15 MHz, and 20 MHz are specified in an existing LTE communications system. A bandwidth supported by the low-complexity or low-cost user equipment is less than 20 MHz. For example, a signal bandwidth that can be supported by the low-complexity or low-cost user equipment is 1.4 MHz or N (N is a positive integer, for example, N=6) physical resource blocks. For the LTE system, one physical resource block occupies a frequency resource of 180 KHz. At a same moment, the low-complexity or low-cost user equipment can receive or send information on only one subband resource.

S502. Determine, according to the set of control channel configuration information, control channel configuration information used to transmit a control channel.

Specifically, this step may be implemented in the following two manners:

In a first manner, one or more pieces of configuration information used to transmit the control channel are determined according to one or more of a first identifier of the user equipment UE, a first system parameter, or a first predetermined rule; and/or in a second manner, a second message is received, the second message is a message sent for one or more UEs in a cell, and the second message and the first message are different messages. For example, the second message carries indication information, and the indication information is used to indicate one or more pieces of configuration information used by the UE to transmit the control channel. For example, the indication information includes one or more pieces of the following information: configuration information index information, frequency resource index information, or time resource index information. Alternatively, the second message is used to carry UE-dedicated related configuration information in the control channel configuration information, and the control channel configuration information used to transmit the control channel is determined according to the configuration information in the first message and the UE-dedicated related configuration information.

S503. Transmit the control channel according to the determined control channel configuration information used to transmit the control channel.

In this embodiment, user equipment may determine one or more pieces of configuration information used to transmit a control channel, and transmit the control channel according to the one or more pieces of configuration information. Therefore, when transmitting the control channel, the UE can transmit, according to the one or more pieces of configuration information, a control channel configured according to the configuration information. In this way, transmission complexity of the UE is reduced.

In another embodiment, control channel configuration information is associated with a subband.

Figure 6:
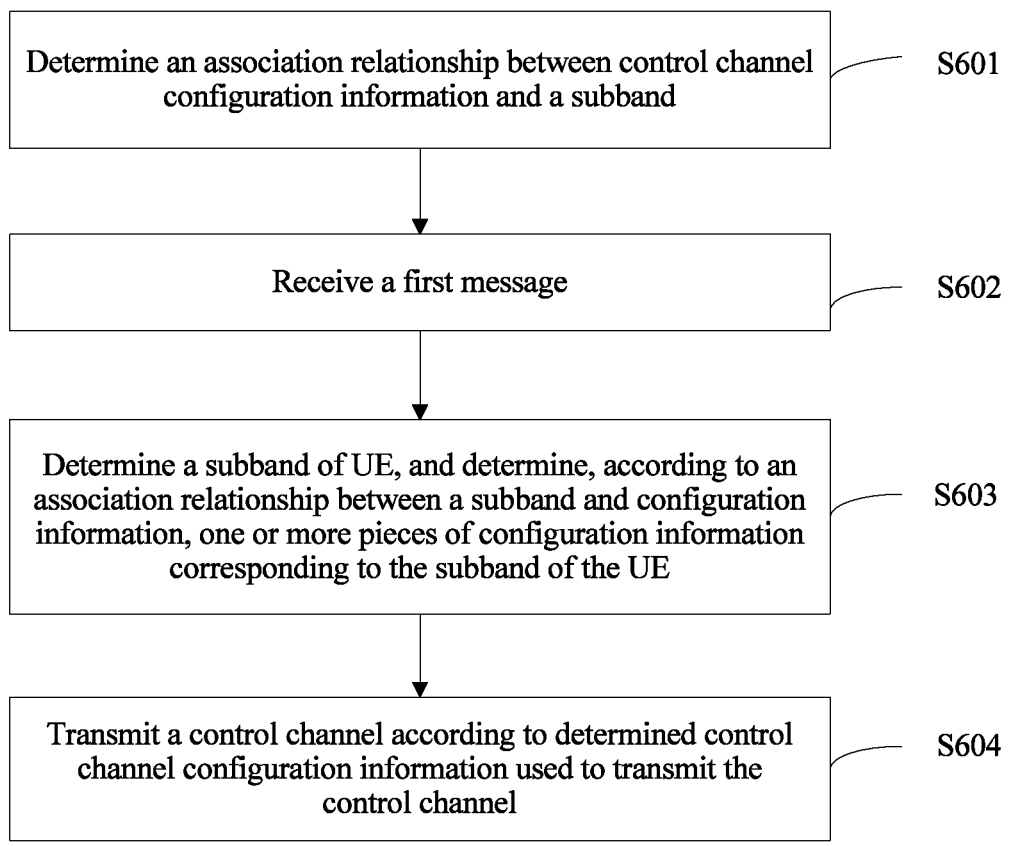
FIG. 6 is a schematic flowchart of a control channel transmission method according to another embodiment of this application.

FIG. 6 is a schematic flowchart of a control channel transmission method according to another embodiment of this application.

As shown in FIG. 6, the control channel transmission method provided in this embodiment of this application includes the following steps.

S601. Determine an association relationship between control channel configuration information and a subband, where the subband is used to transmit the first message, and each subband is associated with one or more pieces of configuration information. The association relationship between control channel configuration information and a subband may be predefined, or may be determined by a base station and notified by the base station to user equipment.

S602. Receive the first message, where the first message includes a set of control channel configuration information, and the set of control channel configuration information includes one or more pieces of configuration information.

Each piece of configuration information in the set of control channel configuration information is used to indicate a first parameter configuration used to transmit one or more control channels.

S603. Determine a subband of the UE, and determine, according to an association relationship between a subband and configuration information, one or more pieces of configuration information corresponding to the subband of the UE.

In actual application, the UE may determine, according to one or more of a UE-specific identifier, a system parameter, or a predetermined rule, a downlink subband on which the UE is to receive data. Alternatively, the base station may explicitly or implicitly indicate subband information to the UE by using signaling or a channel. For example, the base station indicates the subband information to the UE by using an RAR.

For example, the UE-specific identifier may be one or more of a preamble index, a temporary cell radio network temporary identifier, a cell radio network temporary identifier, an international mobile temporary mobile station identifier (e.g., S-TMSI), an international mobile subscriber identity (IMSI), an international mobile equipment identity (IMEI), or a randomly generated number. For example, the system parameter may be a system time parameter and/or a system configuration parameter. For example, the system time parameter may be one or more of a radio frame number, a subframe number, a hyper frame number, or a cycle. For example, the system configuration parameter is a parameter configured in a system message or a parameter implicitly indicated in a system message.

The following provides specific description by using an example:

It is assumed that the base station configures three subbands for the UE, and each subband is corresponding to two pieces of control channel configuration information. A relationship between each subband and control channel configuration information corresponding to the subband is as follows:

A subband 1 is corresponding to control channel configuration information 1 and control channel configuration information 2;

a subband 2 is corresponding to control channel configuration information 3 and control channel configuration information 4; and a subband 3 is corresponding to control channel configuration information 5 and control channel configuration information 6.

The UE first determines the subband of the UE according to an IMSI, for example, an IMSI modulo 3. Assuming that an IMSI modulo 3 of UE1 is equal to 1, the UE1 determines that the subband of the UE1 is the subband 2. Then, the UE determines control channel configuration information corresponding to a downlink subband. Because the subband determined by the UE is the subband 2, the UE learns of the control channel configuration information 3 and the control channel configuration information 4 that are corresponding to the subband 2. When detecting the control channel, the UE may detect the control channel according to the control channel configuration information 3 and/or the control channel configuration information 4. The UE may attempt to blindly detect the control channel according to different control channel configuration information. For example, the UE first detects the control channel according to the control channel configuration information 3. If the control channel detection fails, the UE may detect the control channel according to the control channel configuration information 4. Certainly, to prevent the UE from performing blind detection according to control channel configuration information, each subband may be corresponding to only one piece of control channel configuration information. Alternatively, the UE may determine control channel configuration information of the UE from multiple pieces of control channel configuration information according to the UE-specific identifier and the predetermined rule. Alternatively, the UE may receive signaling, and the signaling indicates specific control channel configuration information that should be used by the UE. For example, the RAR indicates an index of the control channel configuration information to the UE. Specifically, in this example, the RAR may indicate whether the UE1 should use the control channel configuration information 3 or the control channel configuration information 4. In this way, complexity of blind detection by the UE is reduced. For example, a bit in the RAR indicates the index of the control channel configuration information. When the index is 0, it indicates that the control channel configuration information 3 should be used, and when the index is 1, it indicates that the control channel configuration information 4 should be used.

S604. Transmit the control channel according to determined control channel configuration information used to transmit a control channel.

To expand control channel transmission, the base station may send one or more control channels according to one piece of control channel configuration information. When the base station needs to send multiple control channels according to one piece of control channel configuration information, the multiple control channels may be transmitted on different time and/or frequency resources. In this case, when the UE detects the control channel, although the UE assumes or determines control channel configuration information used to detect the control channel, the UE still cannot determine a specific time and/or frequency resource on which a control channel sent by the base station to the UE is transmitted.

To reduce blind detection complexity occurring when the UE detects all possible control channels corresponding to one piece of control channel configuration information, the UE may determine, according to one or more of a UE identifier, a system parameter, or a predetermined rule, a time or frequency resource on which the UE is to monitor the control channel; and/or the base station indicates, by using a third message (for example, an RAR), information about a time or frequency resource on which the UE is to monitor the control channel. For example, the base station adds, into the RAR, the information about the time or frequency resource on which the UE is to monitor the control channel.

Specifically, the UE determines, according to one or more of a second identifier of the UE, a second system parameter, or a second predetermined rule, a time resource and/or a frequency resource on which the UE transmits a control channel; and/or the UE receives a third message, where the third message is a message sent for one or more UEs in a cell, the third message carries indication information, the indication information is used to indicate a time resource and/or a frequency resource on which the UE is to transmit a control channel, and the third message and the first message are different messages. For example, the third message is a random access response message or a UE-dedicated message.

Figure 7:
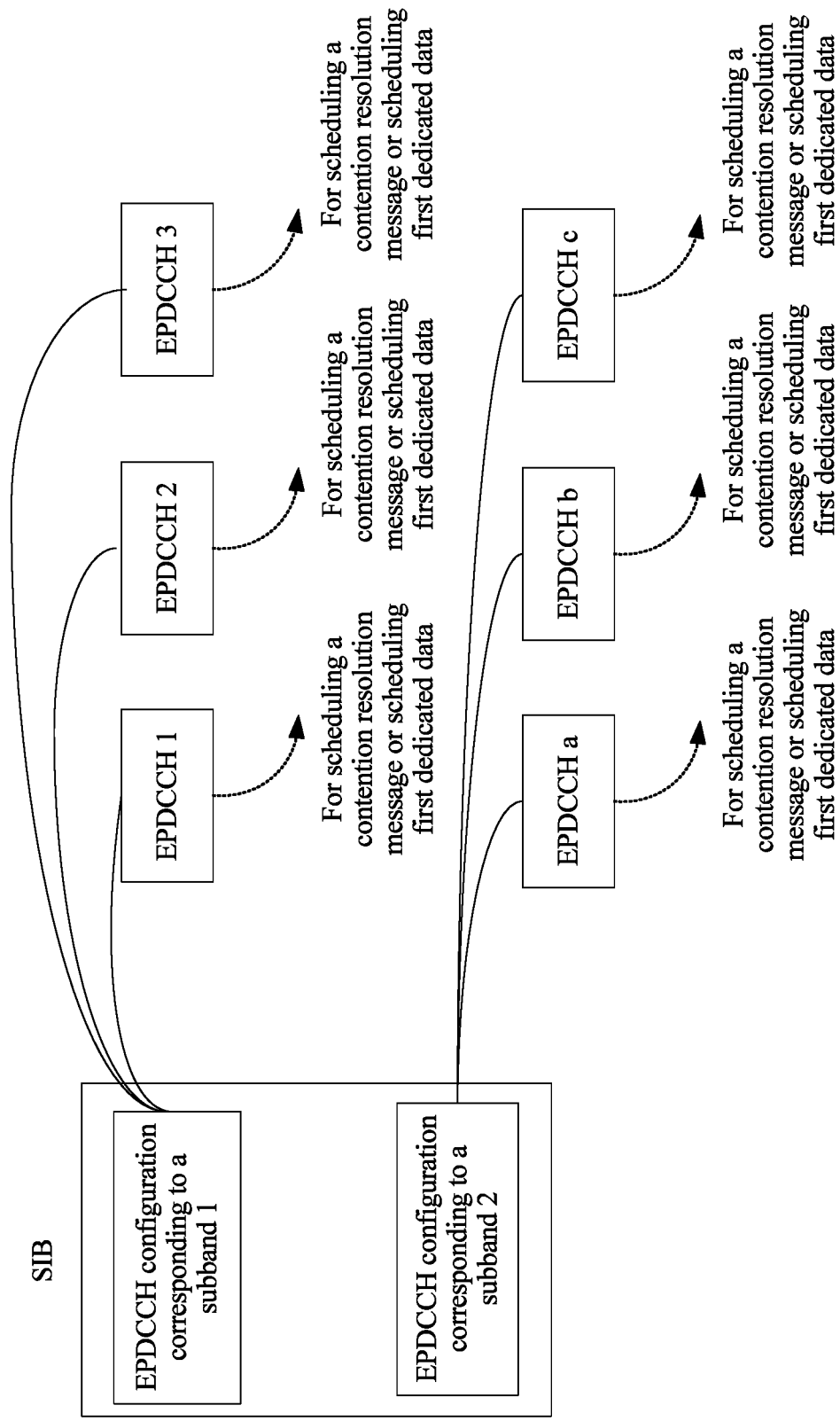
FIG. 7 is a schematic diagram in which when control channel transmission is expanded in a system, UE determines control channel configuration information used to transmit a control channel.

FIG. 7 is a schematic diagram in which when control channel transmission is expanded in a system, UE determines control channel configuration information used to transmit a control channel.

In this embodiment, a control channel is an EPDCCH. System information (for example, a system information block (SIB)) includes EPDCCH configuration information corresponding to two subbands. A base station may send three EPDCCHs on three resources according to each piece of EPDCCH configuration information. The resource may be a time resource or a frequency resource, or a combination of a time resource and a frequency resource. Control channels that may be sent according to an EPDCCH configuration corresponding to a subband 1 are an EPDCCH 1, an EPDCCH 2, and an EPDCCH 3. Control channels that may be sent according to an EPDCCH configuration corresponding to a subband 2 are an EPDCCH a, an EPDCCH b, and an EPDCCH c. As described above, UE first determines a subband of the UE, and determines, according to the determined subband, control channel configuration information corresponding to the subband. Each control channel configuration is corresponding to three resources for control channel detection (or sending). The UE determines a resource for control channel detection according to a UE identifier and a predetermined rule. For example, the UE identifier is an IMSI, and the UE determines the resource for control channel detection according to an IMSI modulo 3. Assuming that an IMSI modulo 3 of the UE is equal to 1, the UE determines that a control channel is detected on a second resource. Certainly, the UE may receive an RAR, obtain indication information that is in the RAR and that indicates a time or frequency resource for control channel monitoring (or receiving), and determine, according to the indication information, a specific time and/or frequency resource on which the control channel is detected.

If a network side device configures multiple enhancement levels for the user equipment, the UE needs to determine an enhancement level (or a transmission level) of the UE. For example, the enhancement level (or the transmission level) may be one or more of a repetition level, a transmission time interval (TTI) bundling level, a coverage enhancement level, a power improvement level, a retransmission level, a continuous attempt level, a channel quality level, or a resource level. For example, the UE may determine the enhancement level (or the transmission level) according to one or more of a channel quality information level, blind attempt, measurement, or channel detection.

When one enhancement level is corresponding to control channel configuration information of multiple subbands, the UE needs to determine the enhancement level of the UE. Then, the UE obtains control channel configuration information that is of multiple subbands and that is corresponding to the determined enhancement level. Next, according to the foregoing method, the UE determines the subband of the UE, and then determines, from multiple pieces of control channel configuration information corresponding to the determined subband, specific control channel configuration information that should be used to detect the control channel.

Figure 8:
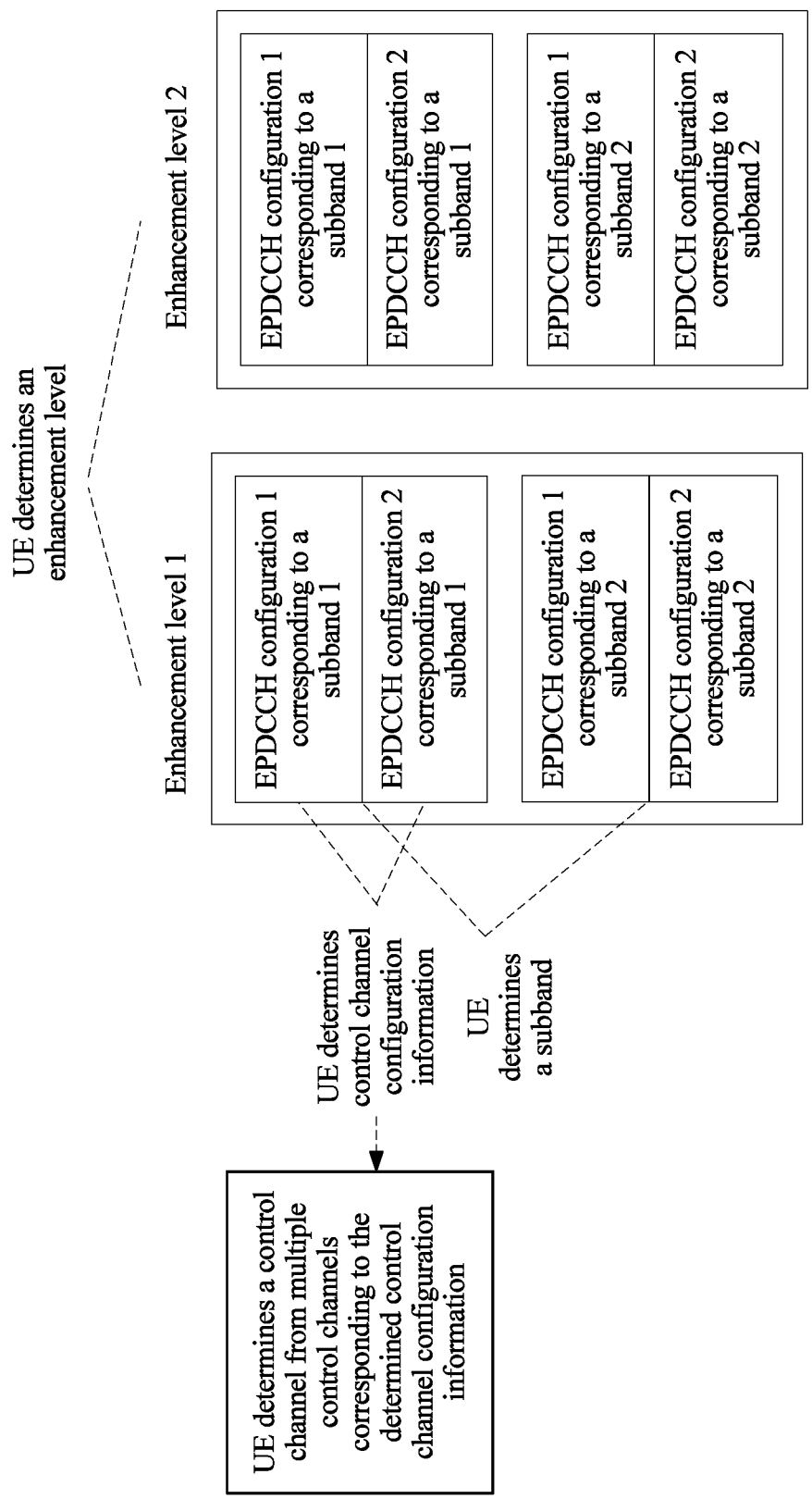
FIG. 8 is a schematic diagram in which UE determines control channel configuration information.

FIG. 8 is a schematic diagram in which UE determines control channel configuration information.

In this embodiment, a subband is associated with control channel configuration information, and user equipment determines, by using a subband, one or more pieces of configuration information used to transmit a control channel, and transmits the control channel according to the one or more pieces of configuration information. Therefore, when receiving or sending the control channel, the UE can transmit the control channel according to a control channel configured according to the one or more pieces of configuration information. In this way, complexity of control channel transmission by the UE is reduced.

In another embodiment, control channel configuration information is associated with a group.

Figure 9:
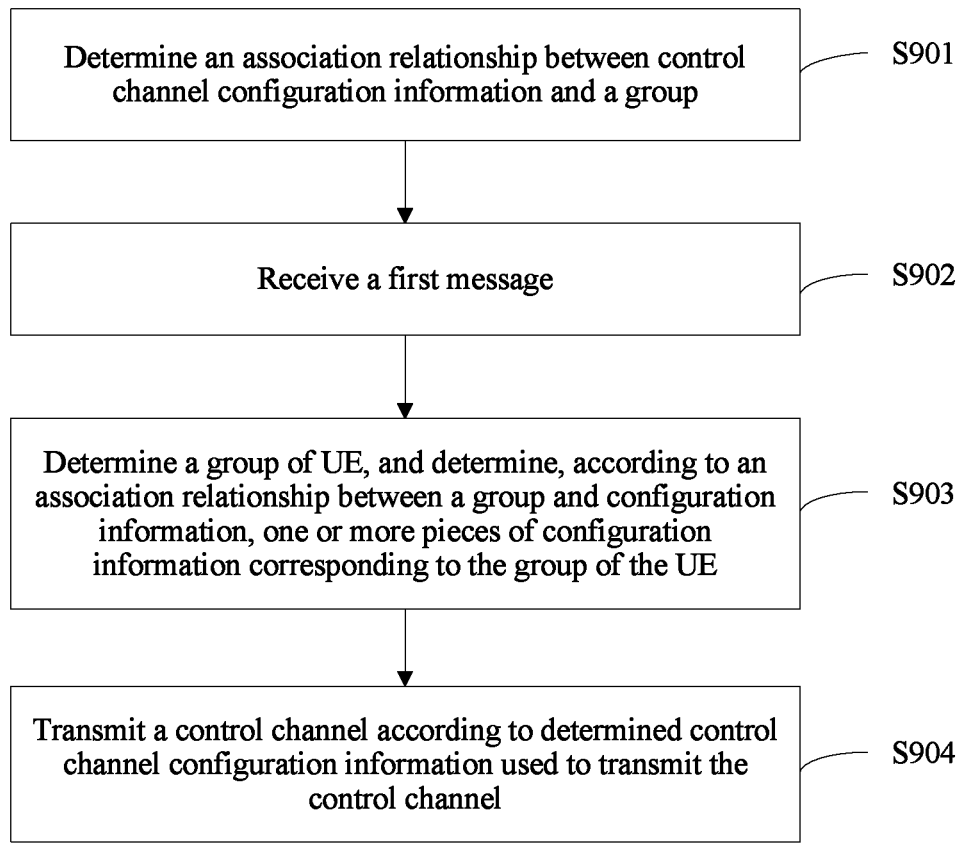
FIG. 9 is a schematic flowchart of a control channel transmission method according to an embodiment of this application.

FIG. 9 is a schematic flowchart of a control channel transmission method according to an embodiment of this application.

As shown in FIG. 9, the control channel transmission method provided in this embodiment of this application includes the following steps.

S901. Determine an association relationship between control channel configuration information and a group, where the association relationship between control channel configuration information and a group may be predefined, or may be determined by a base station and notified by the base station to user equipment.

S902. Receive a first message, where the first message includes a set of control channel configuration information, and the set of control channel configuration information includes one or more pieces of configuration information.

Each piece of configuration information in the set of control channel configuration information is used to indicate a first parameter configuration used to transmit one or more control channels.

S903. Determine a group of the UE, and determine, according to an association relationship between a group and configuration information, one or more pieces of configuration information corresponding to the group of the UE.

When multiple pieces of control channel configuration information are associated with one group, the UE may determine, according to one or more of a UE identifier, a system parameter, or a predetermined rule, specific control channel configuration information that is corresponding to the group of the UE and that should be used by the UE to detect the control channel. Alternatively, the base station may notify, by using signaling, the UE of control channel configuration information that should be used by the UE. For example, the base station notifies, by using an RAR, the UE of the control channel configuration information that should be used by the UE. When obtaining the RAR, the UE learns of the specific control channel configuration information that should be used to detect the control channel.

The following provides specific description by using an example:

It is assumed that the base station provides three groups for the UE by means of division or configuration, and each group is corresponding to two pieces of control channel configuration information. A relationship between each group and control channel configuration information corresponding to the group is as follows:

A group 1 is corresponding to control channel configuration information 1 and control channel configuration information 2;

a group 2 is corresponding to control channel configuration information 3 and control channel configuration information 4; and a group 3 is corresponding to control channel configuration information 5 and control channel configuration information 6.

A UE identifier is an IMSI, and the UE first determines the group of the UE according to the IMSI, for example, an IMSI modulo 3. Assuming that an IMSI modulo 3 of the UE is equal to 1, the UE determines that the group of the UE is the group 2. Then, the UE determines control channel configuration information corresponding to the group 2. That is, the UE leans of the control channel configuration information 3 and the control channel configuration information 4 that are corresponding to the group 2. When detecting the control channel, the UE may detect the control channel according to the control channel configuration information 3 and/or the control channel configuration information 4. The UE may attempt to blindly detect the control channel according to different control channel configuration information. Certainly, to prevent the UE from performing blind detection according to control channel configuration information, each group of the UE may be corresponding to only one piece of control channel configuration information. Alternatively, the UE determines control channel configuration information of the UE from multiple pieces of control channel configuration information according to the UE-specific identifier and the predetermined rule. For another example, the UE may receive signaling, and learn of the control channel configuration information of the UE by using the received signaling. For example, the RAR indicates an index of the control channel configuration information to the UE.

Similar to description in the foregoing embodiment, the base station may send one or more control channels according to one piece of control channel configuration information. When the base station needs to send multiple control channels according to one piece of control channel configuration information, the multiple control channels may be transmitted on different time and/or frequency resources. The UE may determine, according to one or more of a UE identifier, a system parameter, or a predetermined rule, a time or frequency resource on which the UE is to monitor the control channel; and/or the base station adds, into the RAR, indication information of the time or frequency resource on which the UE is to monitor the control channel.

Figure 10:
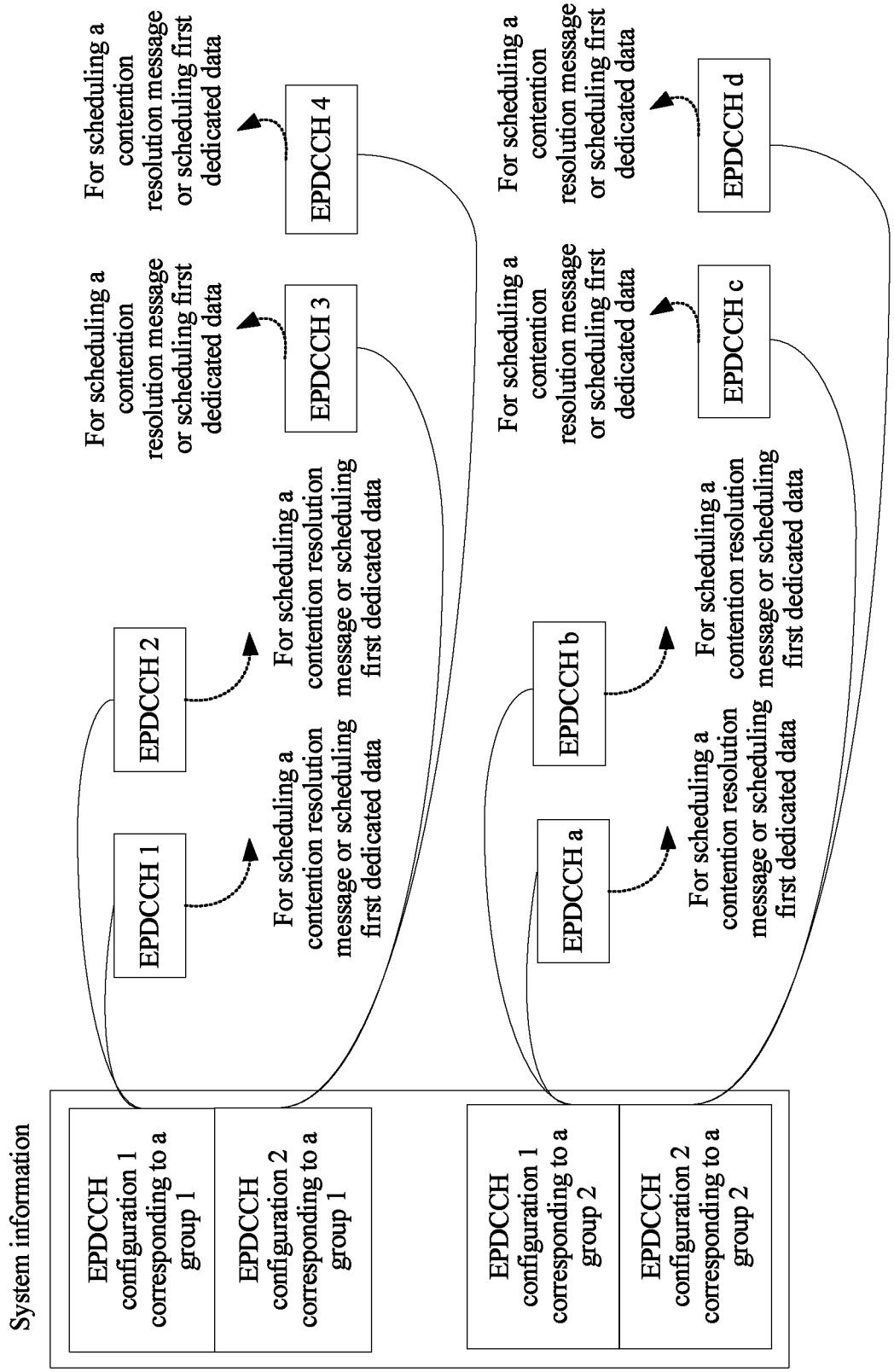
FIG. 10 is a schematic diagram in which when control channel transmission is expanded in a system, UE determines control channel configuration information used to transmit a control channel.

FIG. 10 is a schematic diagram in which, when control channel transmission is expanded in a system, UE determines control channel configuration information used to transmit a control channel.

In the figure, system information includes EPDCCH configuration information corresponding to two groups. Each group is corresponding to two pieces of EPDCCH configuration information. Each piece of EPDCCH configuration information is associated with transmission of two control channels. Therefore, when receiving a control channel, UE needs to first determine a group in which the UE is located, then determines an EPDCCH configuration, and next obtains an EPDCCH that is to be monitored in the EPDCCH configuration, so as to perform EPDCCH detection.

If a network side device configures multiple enhancement levels for the user equipment, the UE needs to determine an enhancement level (or a transmission level) of the UE. When one enhancement level is corresponding to control channel configuration information of multiple groups, the UE needs to determine the enhancement level of the UE. Then, the UE obtains control channel configuration information that is of multiple groups and that is corresponding to the determined enhancement level. Next, according to the foregoing method, the UE determines the group of the UE, and then determines, from multiple pieces of control channel configuration information included in the determined group, specific control channel configuration information that should be used to detect the control channel.

Figure 11:
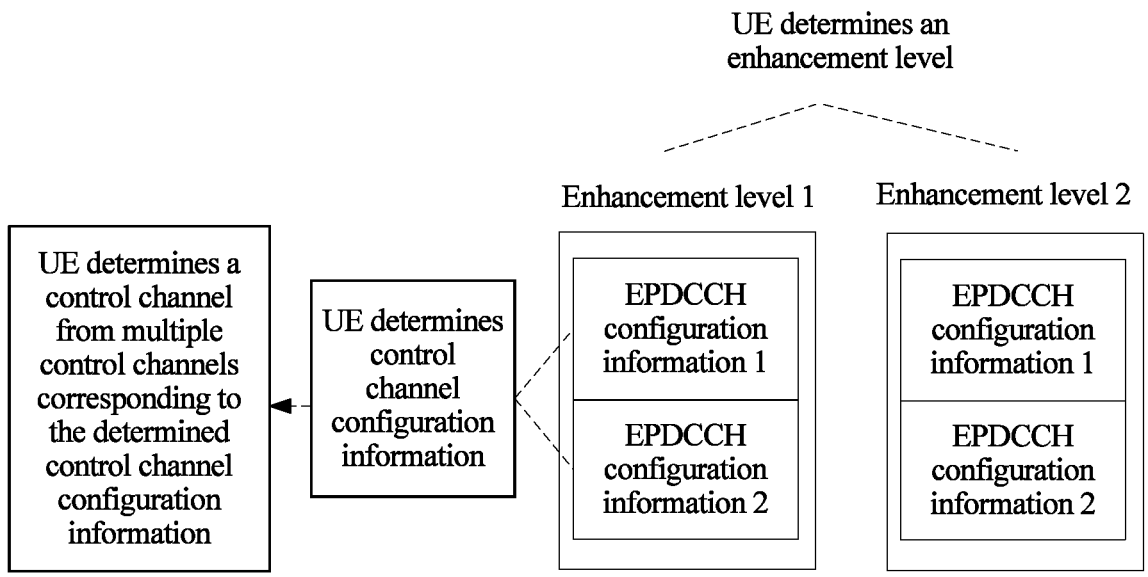
FIG. 11 is a schematic diagram in which UE determines control channel configuration information.

FIG. 11 is a schematic diagram in which UE determines control channel configuration information.

In this embodiment, a group is associated with control channel configuration information, and user equipment determines, by using a group, one or more pieces of configuration information used to transmit a control channel, and transmits the control channel according to the one or more pieces of configuration information. Therefore, when transmitting the control channel, the UE can determine, according to the one or more pieces of control channel configuration information, a control channel configured according to the configuration information. In this way, complexity of control channel transmission by the UE is reduced.

Figure 12:
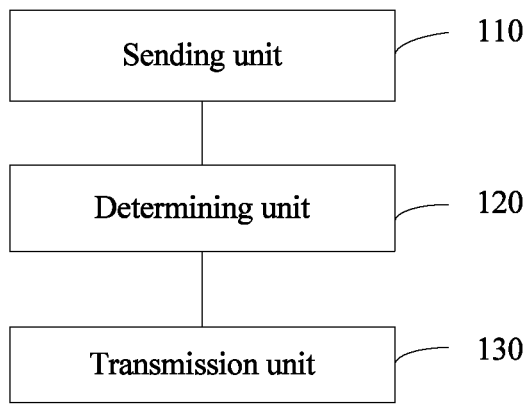
FIG. 12 is a schematic structural diagram of a control channel transmission apparatus according to an embodiment of this application.

This application further provides a control channel transmission apparatus. FIG. 12 is a schematic structural diagram of a control channel transmission apparatus according to an embodiment of this application.

As shown in FIG. 12, the control channel transmission apparatus includes: a sending unit 110, a determining unit 120, and a transmission unit 130.

The sending unit 110 is configured to send a first message to user equipment UE, where the first message includes a set of control channel configuration information, and the set of control channel configuration information includes one or more pieces of configuration information. Each piece of configuration information in the set of control channel configuration information is used to indicate a first parameter configuration used to transmit one or more control channels.

The determining unit 120 is configured to determine, for the user equipment UE according to the set of control channel configuration information, control channel configuration information used to transmit a control channel.

The transmission unit 130 is configured to transmit the control channel according to the control channel configuration information that is determined for the UE and used to transmit the control channel.

Preferably,
the control channel is a UE-dedicated control channel; and/or
the control channel is a cell-dedicated control channel;
the first message is a common message, and the common message is a message sent for all UEs or some UEs in a cell;
different configuration information is used to configure, for different control channels, a first parameter used to transmit the control channels;
the first message is system information; and
the control channel is a control channel for scheduling a contention resolution message, the control channel is a first UE-specific control channel, the control channel is a control channel for scheduling a random access response message, or the control channel is an uplink control channel.

Preferably, that each piece of configuration information in the set of control channel configuration information in the sending unit is used to indicate a first parameter used to transmit one or more control channels includes:
a seventh determining unit, configured to determine, according to one or more of a second identifier of the UE, a second system parameter, or a second predetermined rule, a time resource and/or a frequency resource on which the UE is to receive or send a control channel; and/or
a first sending unit, configured to send a third message to the UE, where the third message is a message sent for one or more UEs in a cell, the third message carries indication information, the indication information is used to indicate a time resource and/or a frequency resource on which the UE is to receive or send a control channel, the third message and the first message are different messages, and the third message is a random access response message or a UE-dedicated message.

Preferably, the configuration information in the set of control channel configuration information is associated with a subband; and/or
the configuration information in the set of control channel configuration information is associated with a group; and/or the configuration information in the set of control channel configuration information is associated with an enhancement level.

Correspondingly, the determining unit includes:

a third determining unit, configured to: determine a subband of the UE, and determine, according to an association relationship between a subband and configuration information, configuration information associated with the subband of the UE; and/or a fourth determining unit, configured to: determine a group of the UE, and determine, according to an association relationship between a group and configuration information, configuration information associated with the group of the UE; and/or a fifth determining unit, configured to: determine an enhancement level of the UE, and determine, according to an association relationship between an enhancement level and configuration information, configuration information associated with the enhancement level of the UE.

Preferably, the determining unit includes:

a sixth determining unit, configured to send a second message to the UE, where the second message is a message sent for one or more UEs in a cell, and the second message and the first message are different messages.

The second message carries indication information, and the indication information is used to indicate one or more pieces of configuration information used to transmit the control channel for the UE. For example, the indication information includes one or more pieces of the following information: configuration information index information, frequency resource index information, or time resource index information. Alternatively, the second message is used to carry UE-dedicated related configuration information in the control channel configuration information, and the control channel configuration information used to transmit the control channel is determined according to the configuration information in the first message and the UE-dedicated related configuration information. The second message is a random access response message or a UE-dedicated message.

Preferably, the determining unit includes:

a first determining unit, configured to determine, for the UE according to one or more of a first identifier of the UE, a first system parameter, or a first predetermined rule, one or more pieces of configuration information used to transmit the control channel; and/or a second determining unit, configured to directly determine one or more pieces of configuration information used to transmit the control channel for the UE.

Preferably, the indication information includes one or more pieces of the following information: configuration information index information, frequency resource index information, or time resource index information.

In this embodiment, one or more pieces of configuration information used to transmit a control channel may be determined for user equipment, and the control channel is transmitted according to the one or more pieces of configuration information. Therefore, when transmitting the control channel, the UE can transmit, according to the one or more pieces of configuration information, a control channel configured according to the configuration information. In this way, complexity of control channel transmission by the UE is reduced.

Figure 13:
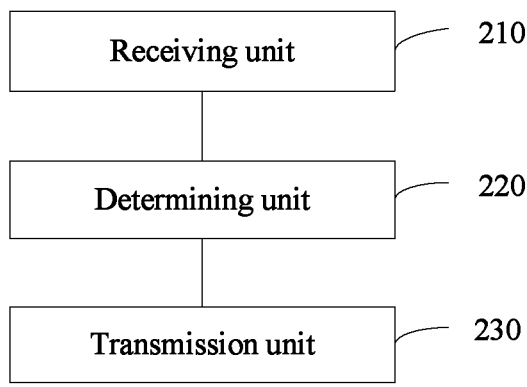
FIG. 13 is a schematic structural diagram of a control channel transmission apparatus according to an embodiment of this application.

This application further provides a control channel transmission apparatus. FIG. 13 is a schematic structural diagram of a control channel transmission apparatus according to an embodiment of this application.

As shown in FIG. 13, the control channel transmission apparatus includes a receiving unit 210, a determining unit 220, and a transmission unit 230.

The receiving unit 210 is configured to receive a first message, where the first message includes a set of control channel configuration information, the set of control channel configuration information includes one or more pieces of configuration information, and each piece of configuration information in the set of control channel configuration information is used to indicate a first parameter configuration used to transmit one or more control channels.

The determining unit 220 is configured to determine, according to the set of control channel configuration information, control channel configuration information used to transmit a control channel.

The transmission unit 230 is configured to transmit the control channel according to the determined control channel configuration information used to transmit the control channel.

Preferably, the control channel is a UE-dedicated control channel; and/or the control channel is a cell-dedicated control channel;

the first message is a common message, and the common message is a message sent for all UEs or some UEs in a cell;

different configuration information is used to configure, for different control channels, a first parameter used to transmit the control channels;

the first message is system information; and the control channel is a control channel for scheduling a contention resolution message, the control channel is a first UE-specific control channel, the control channel is a control channel for scheduling a random access response message, or the control channel is an uplink control channel.

Preferably, the determining unit includes:

a first determining unit, configured to determine, according to one or more of a first identifier of the user equipment UE, a first system parameter, or a first predetermined rule, one or more pieces of configuration information used to transmit the control channel; and/or a second determining unit, configured to receive a second message, where the second message is a message sent for one or more UEs in a cell, the second message carries indication information, the indication information is used to indicate one or more pieces of configuration information used by the UE to transmit the control channel, and the second message and the first message are different messages; or the second message is used to carry UE-dedicated related configuration information in the control channel configuration information, and the control channel configuration information used to transmit the control channel is determined according to the configuration information in the first message and the UE-dedicated related configuration information.

The second message is a random access response message or a UE-dedicated message.

Preferably, the configuration information in the set of control channel configuration information is associated with a subband; and/or the configuration information in the set of control channel configuration information is associated with a group; and/or the configuration information in the set of control channel configuration information is associated with an enhancement level.

Correspondingly, the determining unit includes:

a third determining unit, configured to: determine a subband of the UE, and determine, according to an association relationship between a subband and configuration information, configuration information associated with the subband of the UE; and/or a fourth determining unit, configured to: determine a group of the UE, and determine, according to an association relationship between a group and configuration information, configuration information associated with the group of the UE; and/or a fifth determining unit, configured to: determine an enhancement level of the UE, and determine, according to an association relationship between an enhancement level and configuration information, configuration information associated with the enhancement level of the UE.

Preferably, that each piece of configuration information in the set of control channel configuration information in the receiving unit is used to indicate a first parameter used to transmit one or more control channels includes:

a sixth determining unit, configured to determine, according to one or more of a second identifier of the UE, a second system parameter, or a second predetermined rule, a time resource and/or a frequency resource on which the UE transmits a control channel; and/or a first receiving unit, configured to receive a third message, where the third message is a message sent for one or more UEs in a cell, the third message carries indication information, the indication information is used to indicate a time resource and/or a frequency resource on which the UE is to transmit a control channel, and the third message and the first message are different messages.

The third message is a random access response message or a UE-dedicated message.

Preferably, the indication information includes one or more pieces of the following information: configuration information index information, frequency resource index information, or time resource index information.

In this embodiment, user equipment may determine one or more pieces of configuration information used to transmit a control channel, and transmit the control channel according to the one or more pieces of configuration information. Therefore, when receiving the control channel, the UE can transmit, according to the one or more pieces of configuration information, a control channel corresponding to the configuration information. In this way, complexity of control channel transmission by the UE is reduced.

Based on the foregoing descriptions of the method embodiments, a person skilled in the art may clearly understand that the present disclosure may be implemented by software in addition to a necessary universal hardware platform or by hardware only. In most circumstances, the former is a preferred implementation. Based on such an understanding, the technical solutions of the present disclosure essentially, or the part contributing to the prior art may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a read-only memory (ROM), a random access memory (RAM), a magnetic disk, or an optical disc.

An apparatus embodiment or a system embodiment basically corresponds to a method embodiment, and therefore is described briefly; for related parts, reference may be made to partial descriptions in the method embodiment. The described apparatus or system embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

In the several embodiments provided in the present disclosure, it should be understood that the disclosed system, apparatus and method may be implemented in other manners without departing from the spirit and scope of this application. Current embodiments are merely examples, but not limitations. The provided specific content should not limit objectives of this application. For example, the unit or sub-unit division is merely logical function division and may be other division in actual implementation. For example, a plurality of units or sub-units may be combined. In addition, a plurality of units or modules may be combined or integrated into another system, or some features may be ignored or not performed.

In addition, the system, apparatus and method described herein, and schematic diagrams of different embodiments can be combined or integrated with other systems, modules, technologies, or methods without departing from the scope of this application. In addition, the displayed or discussed mutual couplings or direct couplings or communication connections may be implemented through some interfaces, indirect couplings or communication connections between the apparatuses or units, or electrical connections, mechanical connections, or connections in other forms.

The foregoing descriptions are merely specific implementations of the present disclosure. It should be noted that a person of ordinary skill in the art may make several improvements or polishing without departing from the principle of the present disclosure and the improvements or polishing shall fall within the protection scope of the present disclosure.

What is claimed is:

1. A control channel transmission method at a network side device, the method comprising:

sending a first message to a user equipment (UE), wherein the first message comprises common configuration information for a physical uplink control channel (PUCCH), and wherein the common configuration information for the PUCCH is associated with a first subband;

sending a second message to the UE, wherein the second message is dedicated to the UE and comprises dedicated configuration information for the PUCCH, wherein the dedicated configuration information for the PUCCH is associated with a second subband and comprises a code rate for the PUCCH;

sending a to-be-detected downlink control channel to the UE after sending the second message to the UE, wherein the second message further comprises information for eliminating blind detection performed by the UE on the to-be-detected downlink control channel, and wherein the information for eliminating blind detection comprises a frequency hopping pattern and a transmission time interval (TTI) bundling level; and receiving, according to the common configuration information for the PUCCH and the dedicated configuration information for the physical uplink control channel, the PUCCH.

2. The method according to claim 1, wherein the common configuration information for the PUCCH comprises at least one of: frequency hopping information for the PUCCH or resource information for the PUCCH.

3. The method according to claim 1, wherein the first message is a system information block (SIB), wherein the SIB includes enhanced physical downlink control channel (EPDCCH) information corresponding to two subbands, and wherein the second message is a random access response (RAR) message.

4. The method according to claim 3, further comprising sending a third message to the UE, wherein the third message is a UE-dedicated message comprising information about a time and/or frequency on which the UE is to monitor multiple control channels.

5. The method according to claim 1, wherein the first message further comprises common configuration information of a search space, and wherein the method further comprises sending, according to the common configuration information of the search space, a second to-be-detected downlink control channel in the search space.

6. The method according to claim 1, wherein the second message further comprises dedicated configuration information of a search space, and wherein the method further comprises sending, according to the dedicated configuration information of the search space, a downlink control channel.

7. The method according to claim 1, further comprising determining the second subband according to an identifier of the UE, wherein the second subband is not the same as the first subband.

8. A network side device, comprising:
a transmitting circuit configured to:
send a first message to a user equipment (UE), wherein the first message comprises common configuration information for a physical uplink control channel (PUCCH), and wherein the common configuration information for the PUCCH is associated with a first subband;
send a second message, wherein the second message is dedicated to the UE and comprises dedicated configuration information for the PUCCH, wherein the dedicated configuration information for the PUCCH is associated with a second subband and comprises a code rate for the PUCCH; and
send a to-be-detected downlink control channel to the UE after sending the second message to the UE, wherein the second message further comprises information for eliminating blind detection performed by the UE on the to-be-detected downlink control channel, and wherein the information for eliminating blind detection comprises a frequency hopping pattern and a transmission time interval (TTI) bundling level; and
a receiving circuit configured to receive, according to the common configuration information for the PUCCH and the dedicated configuration information for the PUCCH, the PUCCH.

9. The device according to claim 8, wherein the common configuration information for the PUCCH comprises at least one of: frequency hopping information for the PUCCH or resource information for the PUCCH.

10. The device according to claim 8, wherein the first message is a system information block (SIB), and wherein the second message is a random access response (RAR) message.

11. The device according to claim 8, wherein the first message further comprises common configuration information of a search space, and wherein the transmitting circuit is further configured to send, according to the common configuration information of the search space, a downlink control channel.

12. The device according to claim 8, wherein the second message further comprises dedicated configuration information of a search space, and wherein the transmitting circuit is further configured to send, according to the dedicated configuration information of the search space, a downlink control channel.

13. The device according to claim 8, wherein the second subband is not the same as the first subband, wherein the first subband is used to send the first message to the UE, and wherein the second subband is used to receive the PUCCH from the UE.

14. A user equipment (UE) device, comprising:
a receiving circuit configured to:
receive a first message comprising common configuration information for a physical uplink control channel (PUCCH), wherein the common configuration information is associated with a first subband; and
receive a second message transmitted to the UE, wherein the second message is dedicated to the UE and comprises dedicated configuration information for the PUCCH, wherein the dedicated configuration information is associated with a second subband and comprises a code rate for the PUCCH;
a processing circuit configured to detect, according to the dedicated configuration information, a downlink control channel without performing blind detection on the downlink control channel, wherein the dedicated configuration information comprises a freequency hopping pattern and a transmission time interval (TTI) bundling level; and
a transmitting circuit configured to send, according to the common configuration information for the PUCCH and the dedicated configuration information for the PUCCH, the PUCCH.

15. The UE according to claim 14, wherein the common configuration information for the PUCCH comprises at least one of: frequency hopping information for the PUCCH or resource information for the PUCCH.

16. The UE according to claim 14, wherein the first message is a system information block (SIB).

17. The UE according to claim 14, wherein the first message further comprises common configuration information of a search space, and wherein the UE further comprises a processing circuit configured to detect, according to the common configuration information of the search space, a second downlink control channel.

18. The UE according to claim 14, wherein the second message further comprises dedicated configuration information of a search space, and wherein the processing circuit is configured to detect, according to the dedicated configuration information of the search space, a second downlink control channel without the UE performing blind detection on the second downlink control channel.

19. The UE according to claim 14, wherein the second subband is the same as the first subband.

20. The UE according to claim 14, wherein the UE receives the first message and the second message via the first subband and the second subband, respectively, and wherein the UE sends the PUCCH via a third subband.

* * * * *